United States Patent [19]
Hozumi et al.

[11] 3,947,524
[45] Mar. 30, 1976

[54] RESIN COMPOSITION HAVING HIGH IMPACT RESISTANCE

[75] Inventors: Yukio Hozumi; Akira Ohi; Yuzo Toga, all of Sakai; Hiroyuki Yoshizaki, Toyonaka; Hiromitsu Takanohashi, Takarazuka; Yoshitaka Masuda, Toyonaka, all of Japan

[73] Assignees: Daicel Ltd., Osaka; Mitsubishi Gas Chemical Company Inc., Tokyo, both of Japan

[22] Filed: Oct. 23, 1974

[21] Appl. No.: 517,197

[30] Foreign Application Priority Data
Oct. 25, 1973  Japan............................ 48-120161

[52] U.S. Cl. .............................................. 260/873
[51] Int. Cl.² ......................................... C08L 67/06
[58] Field of Search............................ 260/873, 860

[56] References Cited
UNITED STATES PATENTS 3,334,154  8/1967  Kim ................................... 260/860
3,649,712  3/1972  Grabowski ......................... 260/873

*Primary Examiner*—Murray Tillman
*Assistant Examiner*—J. Ziegler
*Attorney, Agent, or Firm*—Woodhams, Blanchard and Flynn

[57] ABSTRACT

A flame retardant resin composition having a high impact resistance is disclosed, containing (A) 20 to 85 weight percent of a high molecular weight aromatic polycarbonate copolymer comprising (1) 2 to 30 molar percent of a bisphenol the nucleus of which is substituted with a halogen and (2) 70 to 98 molar percent of a halogen-free bisphenol and (B) 80 to 15 weight percent of an ABS resin comprising a mixture of (1) a graft copolymer of a butadiene-based rubbery polymer to which is grafted a vinyl aromatic hydrocarbon and acrylonitrile and (2) a copolymer of a vinyl aromatic hydrocarbon and acrylonitrile. The amount of said rubbery polymer is 5 to 40 weight percent of the ABS resin.

3 Claims, 2 Drawing Figures

3,947,524

RESIN COMPOSITION HAVING HIGH IMPACT RESISTANCE

BACKGROUND OF THE INVENTION

1. Field of the Invention

This invention relates to a resin composition having a high impact resistance.

2. Description of the Prior Art

Bisphenols the nucleus of which is substituted with a halogen, particularly, tetrabromobisphenol A, are known to be flame retarding agents. The incorporation of tetrabromobisphenol A in various synthetic resins to obtain flame-retardant resin compositions has been proposed. In one process tetrabromobisphenol A is copolymerized with halogen-free bisphenol such as bisphenol A to improve the flame-retardant property of a polycarbonate resin derived from bisphenol A. In addition, it has been proposed to obtain a flame-retardant resin composition by incorporating said copolymerized polycarbonate into a polycarbonate resin derived from bisphenol A (Japanese Patent Publication No. 24660/1972).

However, a copolymer composition containing such a copolymerized polycarbonate particularly derived from more than 2 mole percent of a nuclear-halogen-substituted bisphenol, is brittle because of the very low impact strength thereof as shown in FIG. 1. In addition, practical limitations occur such as the need for using a higher temperature in the molding because of its reduced melt fluidity.

Therefore, for improving the molding property of the polycarbonate resin, there has been proposed a process wherein a nuclear-halogen-substituted bisphenol A is incorporated therein, or a process wherein a low molecular weight polycarbonate (generally having a polymerization degree of about 2 to 10) derived from a nuclear-halogen-substituted bisphenol is incorporated therein (Japanese Patent Publications Nos. 41422/1972 and 44537/1972). It is impossible, by either of those prior processes, however, to prevent impairment of the physical properties of the resin generally caused by the incorporation of the low molecular weight materials, and it is difficult to retain well-balanced physical properties such as mechanical strength and molding property, even though flame-retardance can be imparted thereto.

BRIEF DESCRIPTION OF THE INVENTION

We have discovered that flame-retardant resin compositions which can be used for general molding purposes and which have remarkably improved impact resistance and many other advantages can be obtained by incorporating an ABS resin into a special high molecular weight polycarbonate copolymer.

More particularly, we have discovered a resin composition comprising a mixture of A. 20 to 85 weight percent of a high molecular weight aromatic polycarbonate copolymer comprising (1) 2 to 30 molar percent of a bisphenol the nucleus of which is substituted with halogen and (2) 70 to 98 molar percent of a halogen-free bisphenol, and B. 80 to 15 weight percent of an ABS resin comprising a mixture of (1) a graft copolymer of a butadiene-based rubbery polymer selected from the group consisting of a polybutadiene and a copolymer derived from a monomeric mixture comprising mainly butadiene, with a vinyl aromatic hydrocarbon and acrylonitrile, and (2) a copolymer of a vinyl aromatic hydrocarbon and acrylonitrile. The amount of the rubbery polymer is from 5 to 40 weight percent of the ABS resin. The resin composition according to the invention has a higher impact strength than said polycarbonate copolymer (A) or said ABS resin (B).

The advantageous properties of resin compositions of the present invention, particularly its high impact strength, will be described below in detail.

Test pieces were prepared by molding a resin composition obtained by mixing (i) a copolymerized polycarbonate copolymer (hereinafter referred to as copolymer (I) ) comprising 3.7 molar percent of a constituent unit obtained from 2,2-bis-(3,5-dibromo-4-hydroxyphenyl) propane (hereinafter referred to as tetrabromobisphenol A) and the remainder was 2,2-bis-(4-hydroxyphenyl) propane (hereinafter referred to as bisphenol A), or a polycarbonate copolymer (hereinafter referred to as copolymer (II) ) comprising 13.4 molar percent of tetrabromobisphenol A and the remainder was bisphenol A; with (ii) an ABS resin obtained by mass-suspension two-stage polymerization of 40 parts by weight of acrylonitrile, 30 parts by weight of styrene, 30 parts by weight of α-methylstyrene and 12 parts by weight of butadiene-styrene copolymer rubber. The constituents (i) and (ii) were mixed in various proportions.

Figure 2:
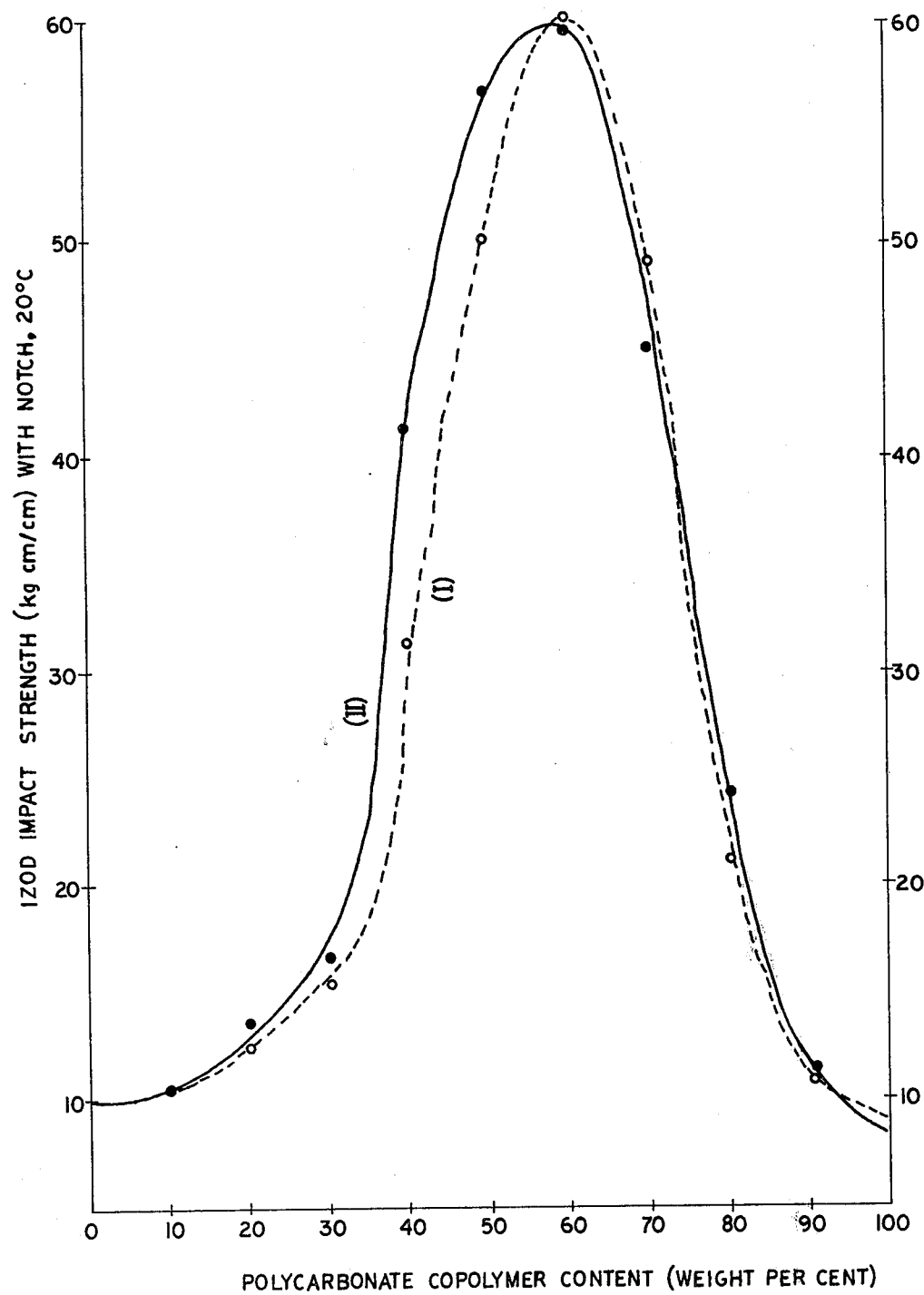
FIG. 2 is a graph showing the interrelationship between the copolymer polycarbonate content and the Izod impact strength of the resin composition of the present invention.

The impact strength of the test pieces (thickness: one-fourth inch, with notch) was measured. The results are shown in FIG. 2. Similar values were obtained using test pieces having a thickness of one-eighth inch. For comparison, the impact strength of a polycarbonate resin comprising bisphenol A conventionally used for general molding purposes was about 15 Kg-cm/cm (test piece thickness: one-fourth inch) and about 95 Kg-cm/cm (test piece thickness: one-eighth inch) by the same test.

If the amount of the nuclear-halogen-substituted bisphenol A (constituent (A) (1) above) in the high molecular weight aromatic polycarbonate copolymer (A) is less than 2 molar percent, the flame retardance property of the resin composition is insufficient, and the improvement in impact strength cannot be obtained unless it is mixed with a special ABS resin as described in the specification of Japanese Patent Laid-open No. 43750/1973. In other words, if the amount of the nuclear-halogen-substituted bisphenol A is less than 2 molar percent, a selectivity is caused with regard to its compatibility with ABS resin and, further, the impact resistance of the mixture depends largely on the thickness of test piece, even if an excellent compatibility is obtained. On the other hand, if the amount of the nuclear-halogen-substituted bisphenol A is more than 30 molar percent, molding of the high molecular weight aromatic polycarbonate copolymer (A) becomes difficult and an improvement in its properties is not achieved even if the ABS resin (B) is incorporated therein.

The halogen-free bisphenol (constituent (A) (2) above) which is a constituent monomer of the polycarbonate copolymer (A) in the composition of this invention includes bisphenols of 2,2-bis(4-hydroxphenyl) alkane having 1 to 10 carbon atoms, and said linkage alkane may be replaced with a linkage such as ether, sulfon, sulfide and sulfoxide. The nuclear-halogen-substituted bisphenols includes tetrahalo compounds which correspond to 3,5-halo-substituted analogues of said halogen-free bisphenols. As a preferred halogen-free bisphenol there can be mentioned unsubstituted bisphenol, i.e., 2,2-bis(4-hydroxyphenyl)propane, also known as bisphenol A (hereinafter referred to as BPA). As a preferred nuclear-halogen-substituted bisphenol there can be mentioned 2,2-bis(3,5-dibromo-4-hydroxyphenyl)propane, also known as tetrabromobisphenol A (hereinafter referred to as TBBPA).

The copolymers derived from these bisphenols and used in the present invention are prepared by known processes for preparing polycarbonates such as the phosgene process, the pyridine process or the chloroformate process. The preferred copolymers have a high molecular weight and a limiting viscosity (at 25°C in methylene chloride) of at least 0.25, preferably 0.45 to 0.75.

If the ABS resin (B) used in the present invention has a rubbery polymer content of less than 5 weight percent, the improvement in impact resistance is not achieved. On the other hand, if the rubbery polymer content is more than 40 weight percent, the lowering in the softening point is marked, and the resin composition becomes unsuitable for use for general purpose molding.

The ABS resin used in the present invention is produced generally by emulsion-polymerizing or solution-polymerizing a vinyl aromatic hydrocarbon and acrylonitrile in the presence of a butadiene-based rubber. In some cases, the ABS resin is produced by adding a previously prepared copolymer of a vinyl aromatic hydrocarbon and acrylontrile to butadiene rubber. The ABS resin product obtained by both processes comprises a mixture of (i) a graft copolymer derived from rubbery butadiene-based polymer as trunk or backbone polymer, and acrylonitrile and the vinyl aromatic hydrocarbon as branches, and a copolymer of (ii) acrylonitrile and (iii) vinyl aromatic hydrocarbon. The preferred proportion of acrylonitrile to the vinyl aromatic hydrocarbon in this ABS resin product is generally 20 to 40 weight percent of acrylonitrile to 60 to 80 weight percent of vinyl aromatic hydrocarbon. As the vinyl aromatic hydrocarbon, there can be used styrene, α-methylstyrene, dimethylstyrene and halogen-nuclear-substituted styrenes.

Conventional commercially available ABS resins have a butadiene rubber content of 5 to 20 weight percent (based on the total resin). The resin also contains copolymer resin components of styrene and acrylonitrile in nearly the same molar proportion (75:25 weight ratio of styrene:acrylonitrile) or in which acrylonitrile is present in a slight excess (72:28 weight ratio). ABS resins can be divided into two classes, namely, emulsion-polymerized ABS resins obtained by polymerizing styrene and acrylonitrile in the rubber latex, and mass-suspension-polymerized ABS resins obtained by dissolving the rubber in styrene and acrylonitrile to effect the polymerization.

In the present invention, either of the two classes of ABS resins noted above can be used.

The polycarbonate containing BPA exhibits a selectivity when it is mixed with ABS resin, as suggested in the specification of Japanese Patent Laid-Open No. 43750/1973. However, the polycarbonate copolymer obtained by copolymerizing the nuclear-halogen-substituted bisphenol A with halogen-free bisphenol A does not possess this special selectivity, and it is compatible with ABS resins prepared by any process. Accordingly, when a polycarbonate is to be incorporated for the purpose of increasing the impact resistance of an ABS resin, the use of a polycarbonate derived from nuclear-halogen-substituted bisphenol A is more preferred than the polycarbonate of BPA alone.

Figure 1:
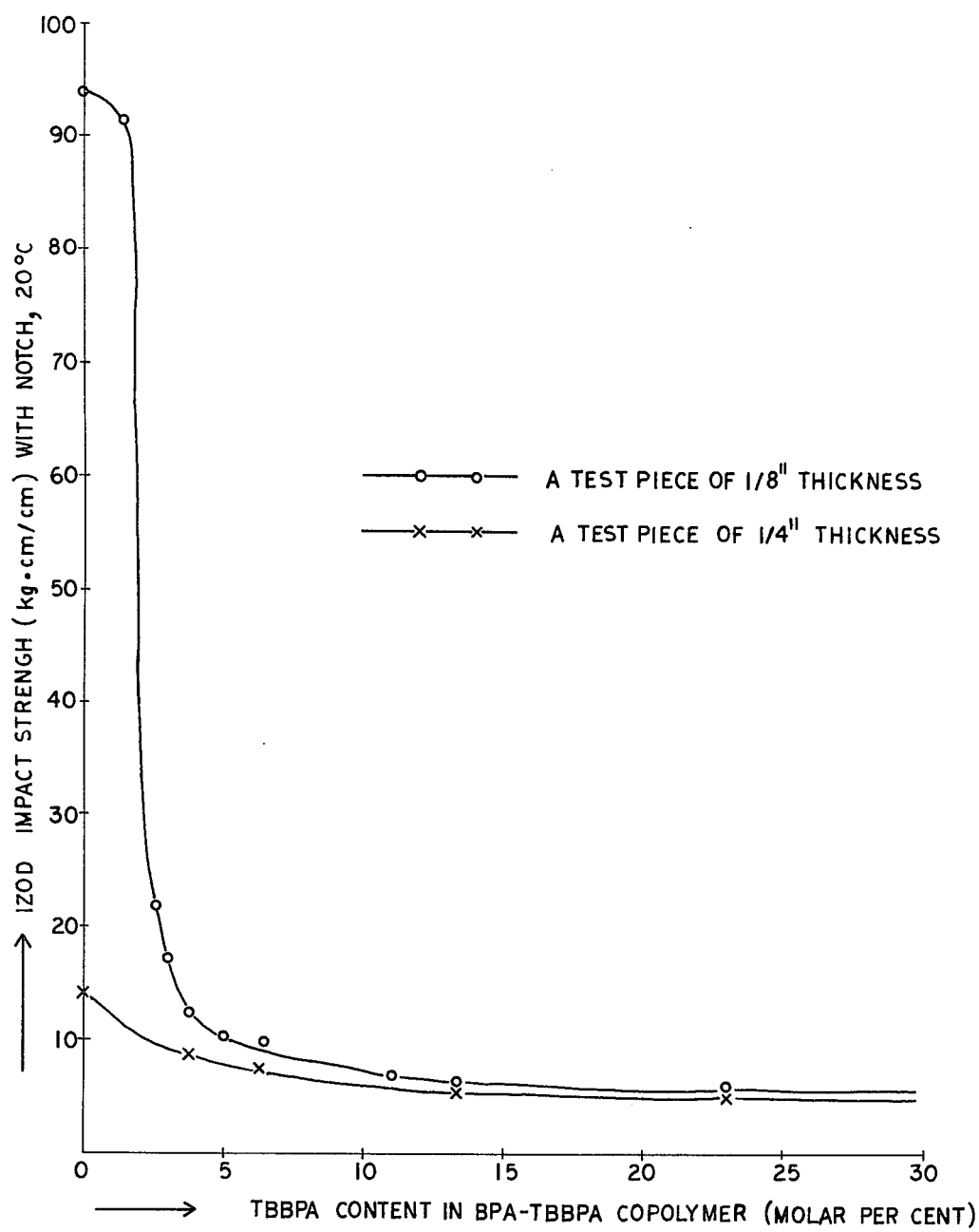
FIG. 1 is a graph showing the interrelationship between tetra bromo bisphenol A (TBBPA) content and the Izod impact strength of a bisphenol A (BPA)-TBBPA copolymer.

As for the polycarbonate employed in the composition of the present invention, the impact resistance of the polycarbonate derived from the nuclear-halogen-substituted bisphenol can be improved and, further, the composition of the present invention is free from dependency of impact strength on thickness as is exhibited generally by polycarbonate resins, i.e. polycarbonate resin of bisphenol A, as shown in FIG. 1. Consequently, it is easy to design molded products employing the novel compositions.

The resin compositions according to this invention consists essentially of 20 to 85 weight percent of nuclear-halogen-substituted polycarbonate copolymer (A) and the balance, i.e., 15 to 80 weight percent of ABS resin (B). Outside these proportions, the physical properties, such as impact strength, of the composition are not improved.

The composition of the present invention can be obtained by melt-mixing polycarbonate copolymer (A) with ABS resin (B) with an ordinary extruder, Banbury mixer or a rolling mill.

To the resin composition of the present invention there can be incorporated known additives and reinforcing agents such as stabilizers, antioxidants, plasticizers, ultraviolet ray-absorbing agents, pigments, dyes, glass fibers and carbon fibers. These can be used in the customary amounts.

The invention will be further described by reference to the following illustrative examples. In the examples, parts are givenly weight.

PREPARATION 1

(Synthesis of polycarbonate copolymer resin of TBBPA and BPA)

Forty-four parts of sodium hydroxide are dissolved in 585 parts water. Into the resulting aqueous solution, there are dissolved 30 parts of TBBPA, 79 parts of BPA, 0.2 part of sodium dithionite and 1.9 parts of p-tert-butylphenol. The solution is then stirred together with 390 parts of methylene chloride. Forty-six parts of phosgene are blown into the mixture at a temperature of 20°C for about 1 hour. After comletion of the blowing of phosgene, the reaction liquor is stirred briskly to emulsify the same. Then, 0.1 part of triethylamine is added thereto, and the stirring is continued for about one hour to effect the polymerization. After completion of the reaction, the aqueous layer is separated out and the resin solution is purified. Thereafter, the resin solution is heated together with water and a swelling agent such as toluene. The solvent is removed to recover the resin as a granular product. The limiting viscosity of the resulting 112 parts of the thus-obtained TBBPA-BPA copolycarbonate resin (in methylene chloride solution) is 0.467 at 25°C. The TBBPA content (which indicates the amount of a constituent derived from TBBPA; the same shall apply hereinafter) in the resin calculated from the Br content is 13.4 molar percent.

PREPARATION 2

(Synthesis of ABS resin)

A rubber solution having a composition as shown below was charged into a 120 liter reactor provided with a powerful stirring device (such as a reactor shown in the specification of Japanese Patent Publication No. 34150/1970)

| | |
|---|---|
| Styrene | 72 parts |
| Acrylonitrile | 28 parts |
| Tufden 2000A (a butadiene-styrene copolymer rubber of Asahi Kasei Co.) | 15 parts |
| Dibenzoyl peroxide | 0.15 part |
| Dicumyl peroxide | 0.10 part |
| t-Dodecylmercaptan | 0.33 part |
| Butyl benzyl phthalate | 3 parts |
| Water | 20 parts |

After replacement of the atmosphere with nitrogen in the apparatus, mass polymerization was effected with agitation at 600 rpm. at 73°C for 3.5 hours. After the mass-prepolymerization was completed, the reaction mixture was introduced in a 250 liter pressure reactor containing a suspension of 4.5 parts of magnesium hydroxide in 80 parts of water. After replacement of the atmosphere with nitrogen in the apparatus, suspension polymerization was effected under stirring at 120 rpm. at 120°C for 5 hours to complete the polymerization reaction. After cooling, hydrochloric acid was added thereto to dissolve out the magnesium hydroxide. After washing thoroughly with water in a centrifugal dryer of the basket type with a 200 mesh filter cloth, the residue was filtered out and dried to obtain beautiful pearly polymer (ABS resin).

The physical properties of the resins prepared in the Preparations are listed in Table 1.

Table 1

| | Test method (ASTM) | Unit | ABS resin | Polycarbonate copolymer (PC) |
|---|---|---|---|---|
| Tensile strength | D-638 | Kg/cm$^2$ | 470 | 745 |
| Tensile break ductility | D-638 | % | 45 | 111 |
| Tensile yield ductility | D-638 | % | 8 | 2 |
| Bending yield strength | D-790 | Kg/cm$^2$ | 670 | 1,010 |
| Bending elasticity modulus | D-790 | Kg/cm$^2$ | 22,300 | 24,300 |
| Izod impact strength (with notch, ¼" thick) | D-256 | Kg.cm/cm | 15.3 | 7.1 |
| Deflection temperature under heat (18.56 kg/cm$^2$, non-annealing) | D-648 | C | 78.1 | 142 |
| Melt index (230°C, load 5 Kg) | D-1238 | g/10min. | 5.8 | * |

*: No flow at 230°C under 5 kg. load.

EXAMPLE 1

Forty parts by weight of the polycarbonate copolymer prepared in Preparation 1 were mixed with 60 parts by weight of the ABS resin prepared in Preparation 2 to obtain a powdery mixture. The mixture was then subjected to extrusion molding using an extruder having a cylinder temperature of 240°C to obtain pellets. From the pellets test pieces were prepared with a molding machine of the screw-in-line type. The mechanical and thermal physical properties were determined according to the specifications of ASTM. The results are shown in Table 2.

EXAMPLE 2

The same process as in Example 1 was repeated except that a commercially available emulsion-polymerized ABS resin (polybutadiene content 13 weight percent, acrylonitrile: styrene=27:73 (weight ratio) ) was used in place of the ABS resin of Preparation 1. The results are shown in Table 2.

EXAMPLE 3

The same process as in Example 1 was repeated except that a polycarbonate copolymer of a TBBPA content of 3.7 molar percent prepared in the same manner as in Preparation 1 was used. The results are shown in Table 2.

EXAMPLE 4

The same process as in Example 1 was repeated except that 60 parts by weight of the polycarbonate copolymer and 40 parts by weight of the ABS resin were used. The results are shown in Table 2.

Table 2

| | Test method (ASTM) | Unit | Example 1 | Example 2 | Example 3 | Example 4 |
|---|---|---|---|---|---|---|
| Tensile strength | D-638 | Kg/cm$^2$ | 598 | 503 | 541 | 624 |
| Tensile ductility (break) | D-638 | % | 23 | 29 | 153 | 62 |
| Tensile ductility (yield) | D-638 | % | 12 | 13 | 12 | 12 |
| Bending yield strength | D-790 | Kg/cm$^2$ | 850 | 840 | 870 | 930 |
| Bending elasticity | D-790 | Kg/cm$^2$ | 22,700 | 21,600 | 24,100 | 23,500 |
| Izod impact strength (with notch, ¼' | D-256 | Kg-cm/cm | 41.4 | 54.5 | 43.7 | 52.0 |

Table 2-continued

| | Test method (ASTM) | Unit | Example 1 | Example 2 | Example 3 | Example 4 |
|---|---|---|---|---|---|---|
| thick) (with notch, ⅛" thick) | | Kg-cm/cm | 42.8 | 52.3 | 45.0 | 54.0 |
| Deflection temperature under heat (18.56 kg/cm$^2$, non-annealing) | D-648 | C | 96.5 | 92.4 | 91.2 | 102.7 |
| Melt index (230°C, load 5 kg.) | D-1238 | g/10 min | 3.6 | 3.1 | 5.4 | 3.0 |

The embodiments of the invention in which an exclusive property or privilege is claimed are defined as follows:

1. A flame-retardant impact-resistant resin composition, in which the resin components consist essentially of a blend of
   A. 20 to 85 weight percent of a high molecular weight aromatic polycarbonate copolymer prepared from a mixture of bisphenols consisting essentially of 2 to 30 molar percent of a bisphenol the nucleus of which is substituted with a halogen and the balance is a halogen-free bisphenol and
   B. the balance is an ABS resin comprising a mixture of (1) a graft copolymer of a butadiene-based rubbery polymer to which is grafted a vinyl aromatic hydrocarbon and acrylonitrile; and (2) a copolymer of a vinyl aromatic hydrocarbon and acrylonitrile, the amount of said rubbery polymer being 5 to 40 weight percent of B.

2. A resin composition according to claim 1 in which the polycarbonate copolymer component A is a copolymer of tetrabromobisphenol A and bisphenol A.

3. A resin composition according to claim 1 in which the polycarbonate copolymer component A has a limiting viscosity of at least 0.25 in methylene chloride at 25°C.

* * * * *